(12) United States Patent
Kim et al.

(10) Patent No.: US 9,812,893 B2
(45) Date of Patent: *Nov. 7, 2017

(54) WIRELESS POWER RECEIVER

(71) Applicant: Samsung Electronics Co., Ltd., Gyeonggi-do (KR)

(72) Inventors: Joon-Il Kim, Seoul (KR); Sung-Bum Park, Gyeonggi-do (KR); Se-Ho Park, Gyeonggi-do (KR); Young-Min Lee, Gyeonggi-do (KR); Woo-Ram Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,887

(22) Filed: Aug. 19, 2016

(65) Prior Publication Data

US 2016/0359357 A1 Dec. 8, 2016

Related U.S. Application Data

(63) Continuation of application No. 13/548,660, filed on Jul. 13, 2012, now Pat. No. 9,425,629.

(30) Foreign Application Priority Data

| | | |
|---|---|---|
| Jul. 14, 2011 | (KR) | 10-2011-0070120 |
| Jul. 15, 2011 | (KR) | 10-2011-0070603 |
| Jul. 11, 2012 | (KR) | 10-2012-0075383 |

(51) Int. Cl.
*H02J 7/00* (2006.01)
*H01F 27/42* (2006.01)
(Continued)

(52) U.S. Cl.
CPC ............. *H02J 7/025* (2013.01); *H02J 7/00* (2013.01); *H02J 7/0021* (2013.01); *H02J 7/045* (2013.01);
(Continued)

(58) Field of Classification Search
CPC ...................................................... H02J 7/025
(Continued)

(56) References Cited

U.S. PATENT DOCUMENTS

| | | |
|---|---|---|
| 6,844,702 B2 | 1/2005 | Giannopoulos et al. |
| 7,656,121 B2 | 2/2010 | Manai et al. |
(Continued)

FOREIGN PATENT DOCUMENTS

EP  2 047 592  5/2011

*Primary Examiner* — Edward Tso
*Assistant Examiner* — Ahmed Omar
(74) *Attorney, Agent, or Firm* — The Farrell Law Firm, P.C.

(57) ABSTRACT

A wireless power receiver for wirelessly receiving driving power from a wireless power transmitter and a method for wirelessly receiving charging power at a wireless power receiver from a wireless power transmitter are provided. The wireless power receiver includes a power reception unit configured to wirelessly receive the charging power from the wireless power transmitter; a rectifier configured to rectify the charging power from the power reception unit; a load unit configured to store the rectified charging power from the rectifier; and a controller configured to detect a change of a charging mode for the load unit, and control to adjust an impedance in the power reception unit according to the change of the charging mode.

6 Claims, 17 Drawing Sheets

(51) Int. Cl.
*H02J 7/02* (2016.01)
*H02J 7/04* (2006.01)
*H02J 50/10* (2016.01)

(52) U.S. Cl.
CPC ....... *H02J 50/10* (2016.02); *H02J 2007/0096* (2013.01)

(58) Field of Classification Search
USPC ........................................................ 320/108
See application file for complete search history.

(56) References Cited

U.S. PATENT DOCUMENTS

| | | | |
|---|---|---|---|
| 7,902,769 B2 | 3/2011 | Shteynberg et al. | |
| 2005/0037256 A1* | 2/2005 | Mukainakano | H01M 10/46 429/61 |
| 2010/0277121 A1 | 11/2010 | Hall et al. | |
| 2012/0025761 A1* | 2/2012 | Takada | H02J 5/005 320/108 |

* cited by examiner

WIRELESS POWER RECEIVER

PRIORITY

This continuation application claims priority under 35 U.S.C. §120 to U.S. patent application Ser. No. 13/548,660, filed on Jul. 13, 2012 in the United States Patent and Trademark Office, and is now U.S. Pat. No. 9,425,629 issued on Aug. 23, 2016, which claims priority under 35 U.S.C. §119(a) to Korean Patent Applications filed in the Korean Intellectual Property Office on Jul. 14, 2011, Jul. 15, 2011 and Jul. 11, 2012 and assigned Serial Nos. 10-2011-0070120, 10-2011-0070603 and 10-2012-0075383, respectively, the entire contents of each of which are incorporated herein by reference.

BACKGROUND OF THE INVENTION

1. Field of the Invention

The present invention relates generally to a wireless power receiver, and more particularly, to a wireless power receiver that can maximize the transmission efficiency of wireless power.

2. Description of the Related Art

Mobile terminals such as, for example, a mobile phone or a Personal Digital Assistant (PDA), are driven by rechargeable batteries. The battery of the mobile terminal is charged through a separate charging apparatus. In general, a separate contact terminal is arranged outside of the charging apparatus and the battery, and the charging apparatus and the battery are electrically connected to each other through the separate contact terminal.

However, since the contact terminal is generally protrudes outwardly in a contact type charging scheme, the contact terminal is easily contaminated by foreign substances. Thus, battery charging is not correctly performed. Further, the battery charging may not be correctly performed when the contact terminal is exposed to moisture.

Recently, wireless charging or non-contact charging technology has been developed and used for electronic devices. Wireless charging technology employs wireless power transmission/reception, and corresponds to, for example, a system in which a battery can be automatically charged if the battery is laid on a charging pad, without connecting the mobile phone to a separate charging connector. Wireless charging technology is generally known to be used with, for example, a wireless electric toothbrush or a wireless electric shaver. Accordingly, a waterproof function can be improved when electronic products are wirelessly charged through wireless charging technology. The portability of electronic devices can be increased since there is no need to provide a wired charging apparatus.

Wireless charging technology largely includes an electromagnetic induction scheme using a coil, a resonance scheme using a resonance, and a Radio Frequency (RF)/microwave radiation scheme converting electrical energy to a microwave and then transmitting the microwave.

A power transmission method through electromagnetic induction corresponds to a scheme of transmitting power between a first coil and a second coil. When a magnet approaches the coil, an induced current is generated. A transmission side generates a magnetic field by using the induced current, and a reception side generates energy through an induced current according to changes in the magnetic field. This phenomenon is referred to as magnetic induction, and the power transmission method using magnetic induction has a high energy transmission efficiency.

With respect to the resonance scheme, a system has been developed in which electricity is wirelessly transferred, using a power transmission principle of the resonance scheme based on a coupled mode theory, even when a device to be charged is separated from a charging device by several meters. A wireless charging system employs a concept that the resonance is a tendency of a wine glass to oscillate at the same frequency as a neighboring tuning fork. An electromagnetic wave containing electrical energy was resonated instead of sounds. The resonated electrical energy is directly transferred only when there is a device having a resonance frequency. Parts of electrical energy, which are not used, are reabsorbed into an electromagnetic field instead of being spread in the air, so that the electrical energy does not affect surrounding machines or people, unlike other electromagnetic waves.

The conventional wireless receiver changes impedance according to a charging amount, and accordingly the wireless charging efficiency is reduced. Therefore, technology is required that changes the impedance of the wireless power receiver based on the charging amount.

SUMMARY OF THE INVENTION

The present invention has been made to address at least the above problems and/or disadvantages and to provide at lest the advantages described below. Accordingly, an aspect of the present invention provides a wireless power receiver that changes impedance by itself according to changes in a charging amount, and a method of controlling the wireless power receiver.

In accordance with an aspect of the present invention, a wireless power receiver configured to wirelessly receive charging power from a wireless power transmitter is provided. The wireless power receiver includes a power reception unit configured to wirelessly receive the charging power from the wireless power transmitter; a rectifier configured to rectify the charging power from the power reception unit; a load unit configured to store the rectified charging power from the rectifier; and a controller configured to detect a change of a charging mode for the load unit, and control to adjust an impedance in the power reception unit according to the change of the charging mode.

In accordance with another aspect of the present invention, a method for wirelessly receiving charging power at a wireless power receiver from a wireless power transmitter is provided. The method includes wirelessly receiving the charging power from the wireless power transmitter, at a wireless reception unit of the wireless power receiver; rectifying the charging power from the power reception unit, at a rectifier of the wireless power receiver; storing the rectified charging power from the rectifier, at a load unit of the wireless power receiver; detecting a change of a charging mode for the load unit; and adjusting an impedance in the power reception unit according to the change of the charging mode.

BRIEF DESCRIPTION OF THE DRAWINGS

The above and other aspects, features and advantages of the present invention will be more apparent from the following detailed description when taken in connection with the accompanying drawings, in which.

DETAILED DESCRIPTION OF EMBODIMENTS OF THE PRESENT INVENTION

Figure 1:
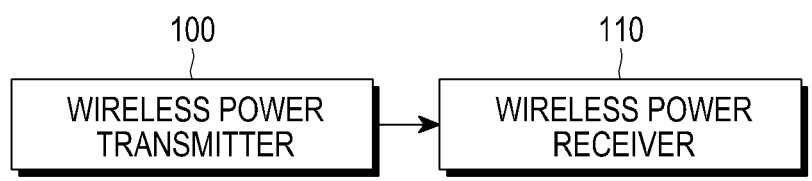
FIG. 1 is a diagram illustrating a wireless power transmission/reception system, according to an embodiment of the present invention.

Embodiments of the present invention are described in detail with reference to the accompanying drawings. The same or similar components may be designated by the same or similar reference numerals although they are shown in different drawings. Detailed descriptions of constructions or processes known in the art may be omitted to avoid obscuring the subject matter of the present invention FIG. 1 is a diagram illustrating a wireless power transmission/reception system, according to an embodiment of the present invention. As shown in FIG. 1, the wireless power transmission/reception system includes a wireless power transmitter 100 and at least one wireless power receiver 110. The wireless power transmitter 100 can configure an electrical connection with the wireless power receiver 110. In embodiments of the present invention, the wireless power transmitter 100 can supply wireless power in a form of an electromagnetic wave to the wireless power receiver 110.

The wireless power transmitter 100 can perform bidirectional communication with the wireless power receiver 110. The wireless power transmitter 100 and the wireless power receiver 110 may be apparatuses that can process or transmit/receive a predetermined communication packet, and may be implemented as, for example, a mobile phone, a PDA, a Personal Media Player (PMP), or a smart phone.

The wireless power transmitter 100 can wirelessly provide power to a plurality of wireless power receivers 110. For example, the wireless power transmitter 100 can transmit power to a plurality of wireless power receivers 110 through a resonance scheme. When the wireless power transmitter 100 adopts the resonance scheme, it is preferable that distances between the wireless power transmitter 100 and the plurality of wireless power receivers 110 be less than or equal to 30 meters (m). Further, when the wireless power transmitter 100 adopts an electromagnetic induction scheme, it is preferable that distances between the wireless power transmitter 100 and the plurality of wireless power receivers 110 be less than or equal to 10 m.

The wireless power receivers 110 receive wireless power from the wireless power transmitter 100 to charge batteries arranged therein. Further, the wireless power receivers 110 can transmit a signal that requests at least one of a wireless power transmission, information required for the wireless power transmission, state information on the wireless power receiver, control information on the wireless power transmitter 100, to the wireless power transmitter 100. Information on the transmission signal is described in greater detail below.

Further, the wireless power receiver 110 can transmit a position information message of the wireless power receiver 110. The position information message of the wireless power receiver 110 may be implemented through near field communication, such as, for example, an RF signal or Bluetooth, which are described in greater detail below.

Furthermore, the wireless power receiver 110 can transmit a charging state message, which indicates a state of the wireless power receiver 110 to the wireless power transmitter 100.

The wireless power transmitter 100 can include a display, which displays respective states of wireless power receivers based on messages received from the respective wireless power receivers. Moreover, the wireless power transmitter 100 can display times at which the charging of the respective wireless power receivers is completed as well.

The wireless power transmitter 100 can transmit a control signal, which disables a charging function, to each of the wireless power receivers 110. The wireless power receiver 110, having received the disable control signal of the wireless charging function from the wireless power transmitter 100, can disable the wireless charging function.

Figure 2A:
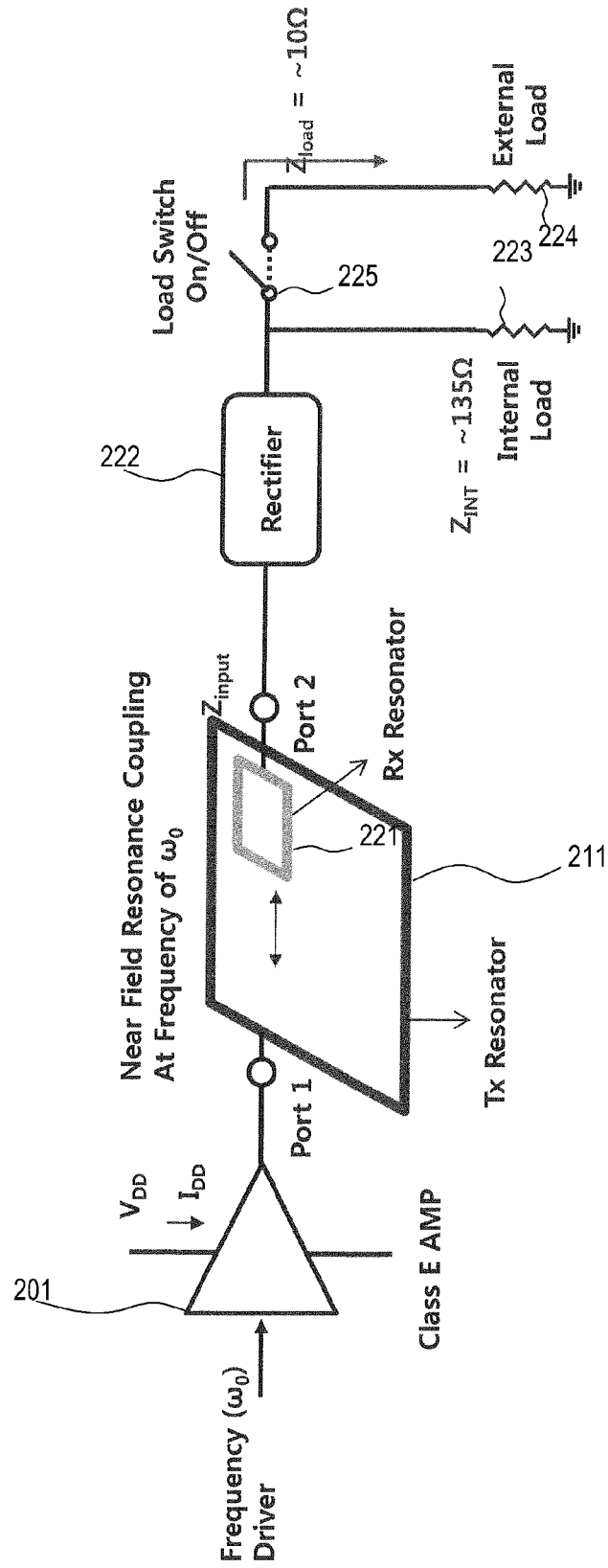
FIG. 2A is a circuit diagram illustrating a wireless power transmitter and receiver, according to an embodiment of the present invention.

FIG. 2A is a circuit diagram illustrating a wireless power transmitter and wireless power receiver, according to an embodiment of the present invention. The wireless power transmitter, according to FIG. 2A, includes an amplifier 201 and a power transmission unit 211. Further, the wireless power receiver includes a power reception unit 221, a rectifier 222, an internal resistance 223, an external resistance 224, and a switch unit 225. The amplifier 201 receives a supply of power, having a voltage of $V_{DD}$ and a current of $I_{DD}$, from a power supplier. The amplifier 201 can output the power after transmitting it in an AC at a frequency of $\omega_0$, which may equal, for example, 6.78 megahertz (MHz). The amplifier 201 may be embodied as a Class E Amp. The power transmission unit 211 wirelessly transmits power to the power reception unit 221. The rectifier 222 rectifies the received power. The switch unit 225 maintains an on state in a charging mode and an off state in a charging completion mode. Impedance viewed from Port 2 is 10Ω when the switch unit 225 is in the on state. The impedance viewed from Port 2 is 135Ω when the switch unit 225 is in the off state.

Figure 2B:
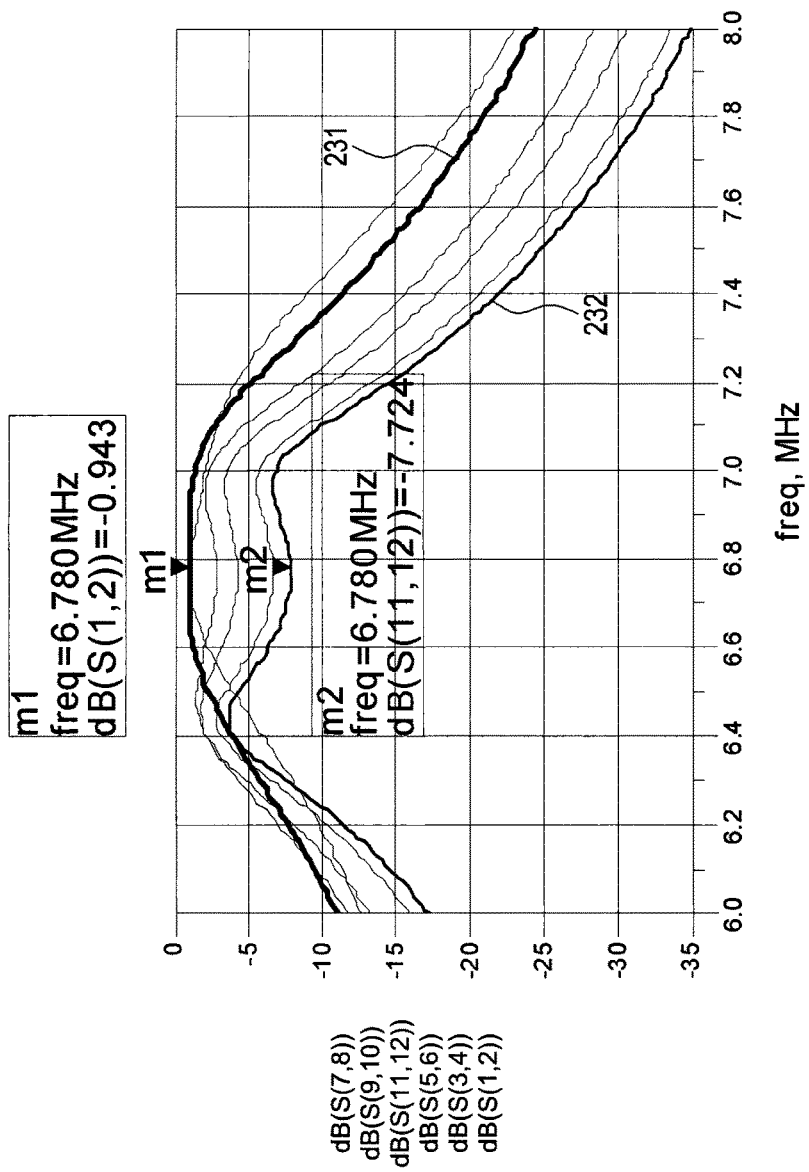
FIG. 2B is a chart showing transmission efficiency of FIG. 2A, according to an embodiment of the present invention.

As described above, a transmission efficiency S21 from the power transmission unit 211 to the power reception unit 221 may be decreased from −1 dB (231) to −8 dB (232) at 6.78 MHz, as shown in FIG. 2B.

Figure 2C:
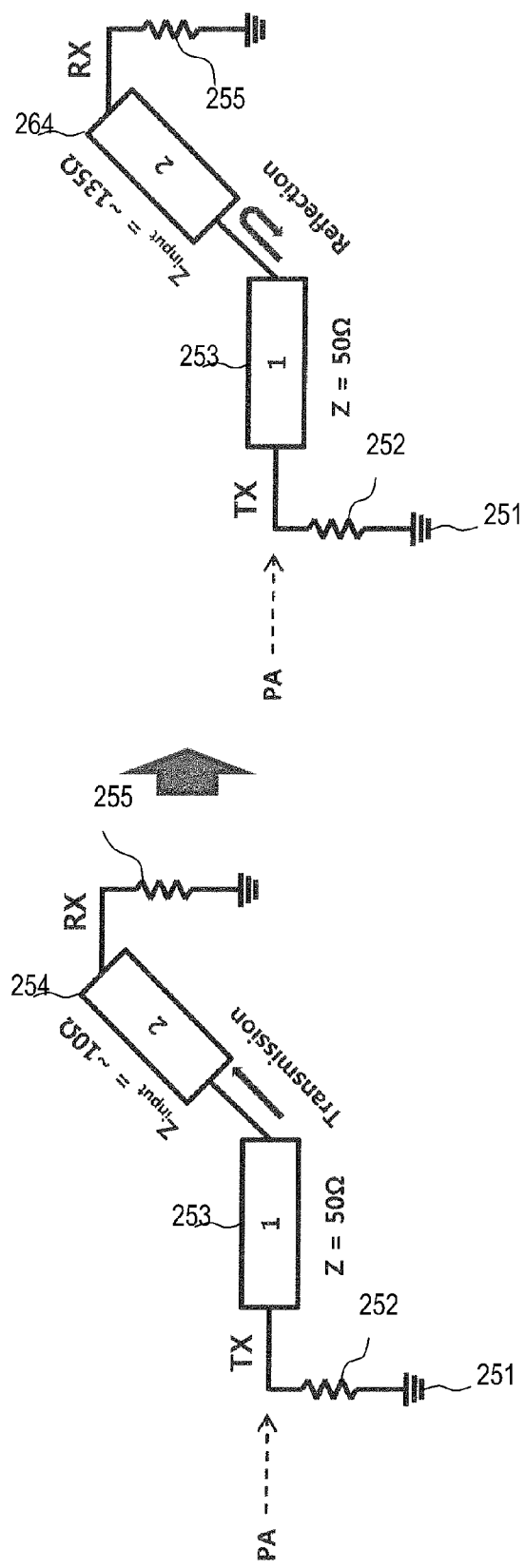
FIG. 2C is a circuit diagram illustrating a wireless power transmitter and receiver, according to an embodiment of the present invention.

The decrease in the transmission efficiency is described with reference to FIG. 2C. A left side of FIG. 2C is circuit diagram illustrating the wireless power transmitter-receiver in the charging mode, according to an embodiment of the present invention. The equivalent circuit may include a ground 251, a resistor 252, one end of which is connected to the ground 251, a load 253, one end of which is connected to the other end of the resistor 252, a load 254, one end of which is connected to the other end of the load 253, and a resistor 255, one end of which is connected to the other end of the load 254. Impedance of the load 253 may be 50Ω, and impedance of the load 254 may be 10Ω.

A right side of FIG. 2C is a circuit diagram illustrating the wireless power transmitter-receiver in the charging completion mode, according to an embodiment of the present invention. It can be identified in the charging completion mode that impedance of a load 264 is increased to 135Ω. Accordingly, some of the power applied from the load 253 to the load 264 is reflected, and the total power transmission/reception efficiency is reduced.

Figure 3:
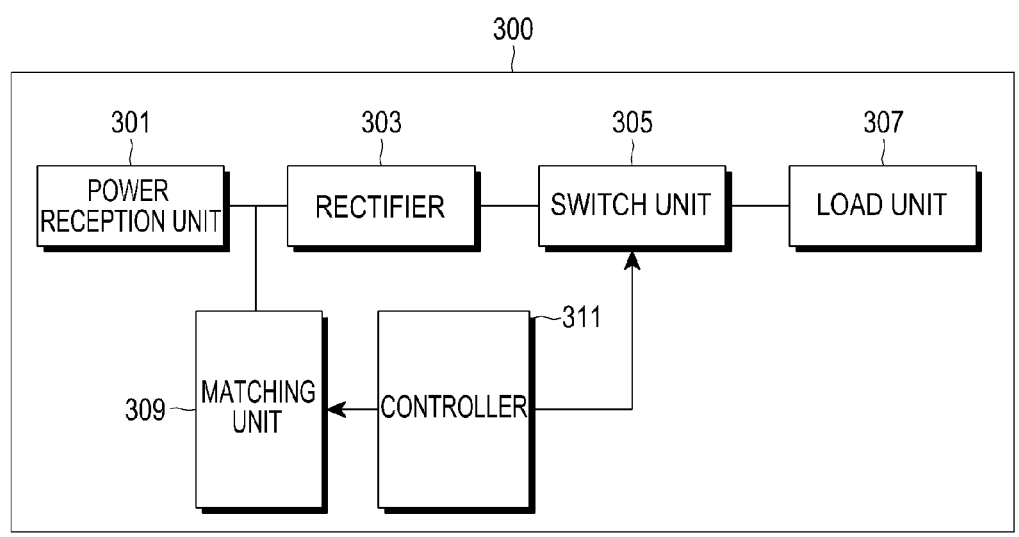
FIG. 3 is a block diagram illustrating a wireless power receiver, according to embodiments of the present invention.

FIG. 3 is a block diagram illustrating a wireless power receiver, according to an embodiment of the present invention.

As shown in FIG. 3, a wireless power receiver 300 includes a power reception unit 301, a rectifier 303, a switch unit 305, a load unit 307, an impedance adjuster (or matching unit) 309, and a controller 311.

The power reception unit 301 can wirelessly receive power from the wireless power transmitter. The power reception unit 301 may be implemented, for example, as a loop coil having a predetermined inductance.

The power that is input to the power reception unit 301 can be output to the rectifier 303.

The rectifier 303 can rectify the received power. The rectifier 303 may be implemented as a known rectifying means such as, for example, a diode. It is easily understood by those skilled in the art that there is no limitation as to how the rectifier is embodied as long as it can perform the rectification. The rectifier 303, according to an embodiment of the present invention, can be embodied as a full-bridge diode. The rectifier 303 can rectify power in an input Direct Current (DC) type to power in an AC type.

The rectifier 303 is connected to the switch unit 305, and the switch unit 305 can turn on/off the connections between the load unit 307 and the rectifier 303.

The impedance adjuster (or matching unit) 309 may include one or more of an inductor, a capacitor, and a resistor, and can be connected to a front end of the rectifier 303. A switch unit may be included between the impedance adjuster (or matching unit) 309 and the rectifier 303. The connection between the impedance adjuster (or matching unit) 309 and the rectifier 303 is controlled by the controller 311. For example, when the switch unit 305 is in the off state, the controller 311 connects the impedance adjuster (or matching unit) 309 to the rectifier 303. The aforementioned inductor, inductance, capacitance of the capacitor, and resistance of the resistor can be changed.

Although FIG. 3 illustrates that the impedance adjuster 309 (or matching unit) is connected to the front end of the rectifier 303, the impedance adjuster (or matching unit) 309 may instead be connected to a rear end of the rectifier 303. In this event, the rectifier 303 may include one or more resistors. The resistance of the resistor can be changed.

The controller 311 can control a general operation of the wireless power receiver 300. The controller 311 can detect the on/off state of the switch unit 305. The controller controls the connection between the impedance adjuster (or matching unit) 309 and the rectifier 303 based on the on/off state of the switch unit 305. For example, the controller 311 can turn a switch unit located between the rectifier 303 and the impedance adjuster (or matching unit) 309 to an off state. The controller 311 connects the impedance adjuster (or matching unit) 309 to the rectifier 303, when the switch unit 305 remains in the off state. For example, the controller 311 turns on a switch unit located between the rectifier 303 and the impedance adjuster (or matching unit) 309.

Specifically, when the wireless power receiver 300 is operated in the charging mode, the controller 311 disconnects the impedance adjuster (or matching unit) 309 from the rectifier 303. Further, when the wireless power receiver 300 is operated in the charging completion mode, the controller 311 connects the impedance adjuster (or matching unit) 309 to the rectifier 303. Here, the charging mode may be a Constant Current (CC) mode, and the charging completion mode may be a Constant Voltage (CV) mode.

In the CC mode, the impedance adjuster (or matching unit) 309 can perform impedance matching. Accordingly, the impedance adjuster (or matching unit) 309 reduces the increased impedance in the charging completion mode and thus converts the impedance to impedance in the charging mode. For example, the impedance adjuster 309 can reduce the impedance of the load 264 of FIG. 2C to 10Ω, and accordingly the power transmission reflection can be reduced.

A regulator can be disposed between the rectifier 303 and the load unit 307. The regulator can filter ripples from input rectified wireless power, and then output the filtered wireless power. The regulator may be implemented as an LC filter in an embodiment of the present invention, and accordingly, compensate so that the rectified wireless power is closer to an AC waveform. Further, the regulator can control an output of the wireless power so that an overflow is not generated when the wireless power is output through an output terminal. The wireless power output by the regulator is output externally, and then may be applied to a load or stored in the load unit 307.

Figure 4A:
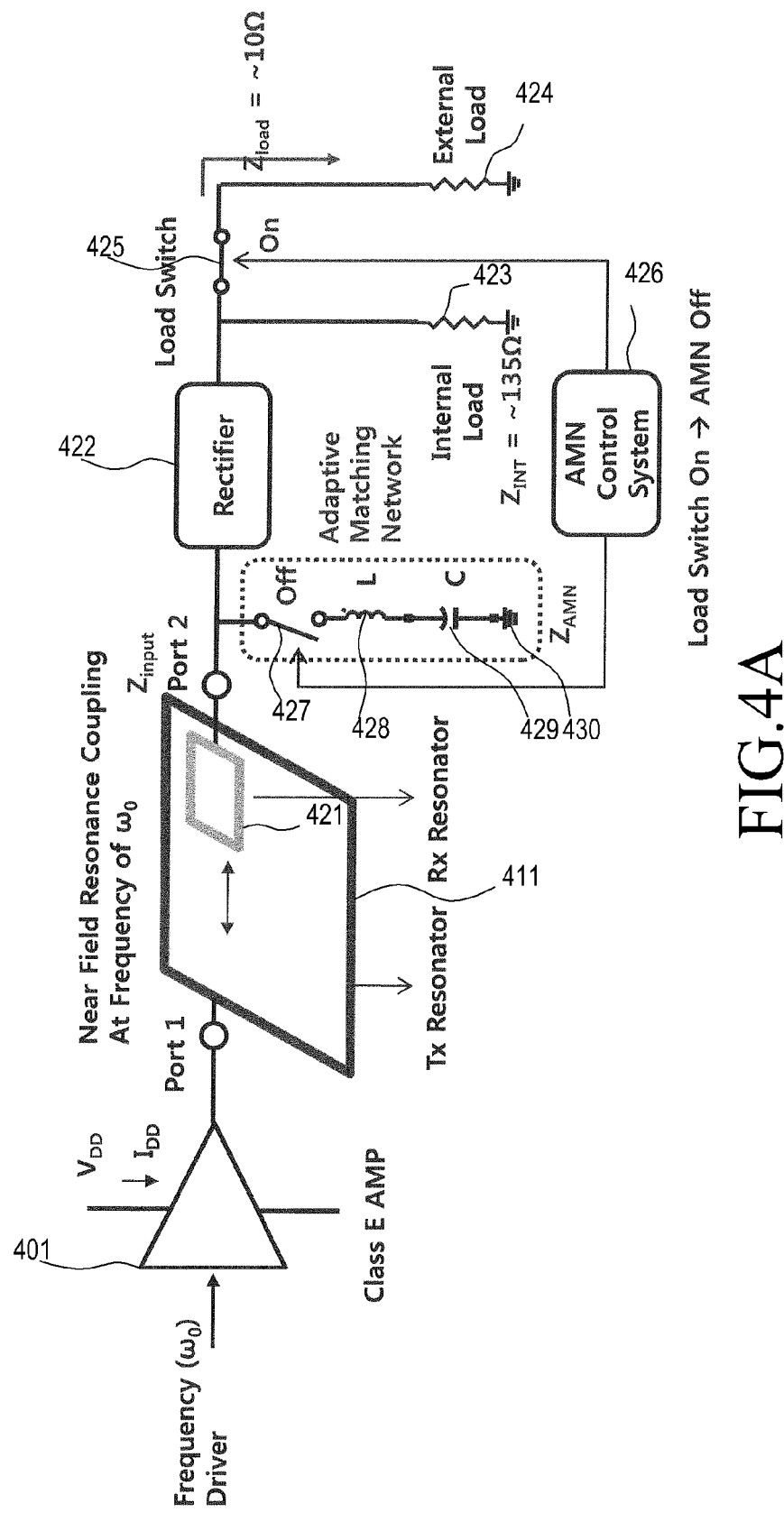
FIGS. 4A and 4B are circuit diagrams illustrating a wireless power transmitters and receivers, according to embodiments of the present invention.
Figure 4B:
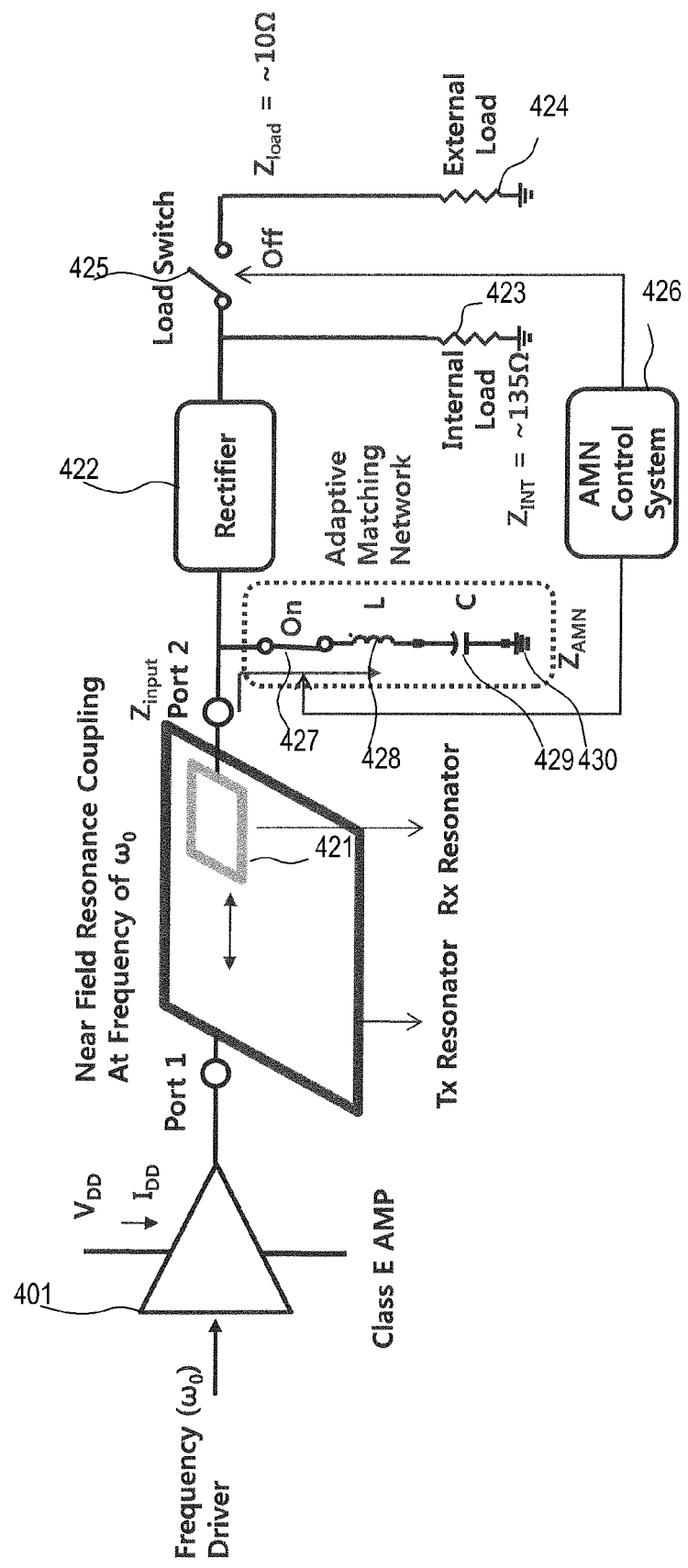

FIGS. 4A and 4B are circuit diagrams illustrating implementation of the wireless power receiver, according to an embodiment of the present invention.

As shown in FIGS. 4A and 4B, a wireless power transmitter includes an amplifier 401 and a power transmission unit 411. Further, a wireless power receiver includes a power reception unit 421, a rectifier 422, an internal resistor 423, an external resistor 424, a first switch unit 425, a controller 426, a second switch unit 427, an inductor unit 428, a capacitor unit 429, and a ground unit 430.

The amplifier 401 receives a supply of power having a voltage of $V_{DD}$ and a current of $I_{DD}$ from a power supplier. The amplifier 401 outputs the power after transmitting it in an AC at a frequency of $\omega_0$, which may be, for example, 6.78 MHz. The amplifier 401 may be embodied as a Class E Amp. The power transmission unit 411 wirelessly transmits power to the power reception unit 421. The rectifier 422 rectifies the received power. Meanwhile, the first switch unit 425 maintains an on state in the charging mode and an off state in the charging completion mode. The impedance viewed from Port 2 is 10Ω when the first switch unit 425 is in the on state, and the impedance viewed from Port 2 is 135Ω when the first switch unit 425 is in the off state. In FIG. 4A, the second switch unit 427 maintains the off state.

For example, the controller 426 maintains the second switch unit 427 in the off state by detecting that the first switch unit 425 is in the on state.

In FIG. 4B, the controller 426 can detect the charging completion mode by identifying that the first switch unit 425 is in the off state. Then, the controller 426 can switch the second switch unit 427 to the on state. When the second switch unit 427 is in the on state, the inductor unit 428, the capacitor unit 429, and the ground unit 430 can be connected to the rectifier 422. Accordingly, impedance viewed from Port 2 can be adjusted to 10Ω. Here, the combined impedance of the inductor unit 428 and the capacitor unit 429 may be greater than or equal to the impedance viewed from Port 2 in the charging mode, for example, 10Ω, and less than the impedance viewed from Port 2 in the charging completion mode, for example, 135Ω.

A resistor unit can be provided with the inductor unit 428 and the capacitor unit 429. Further, as described above, a switch and a resistor can be connected in parallel to a rear end of the rectifier 422. When the second switch unit 427 is in the on state, the impedance can be adjusted by the resistor.

Figure 5:
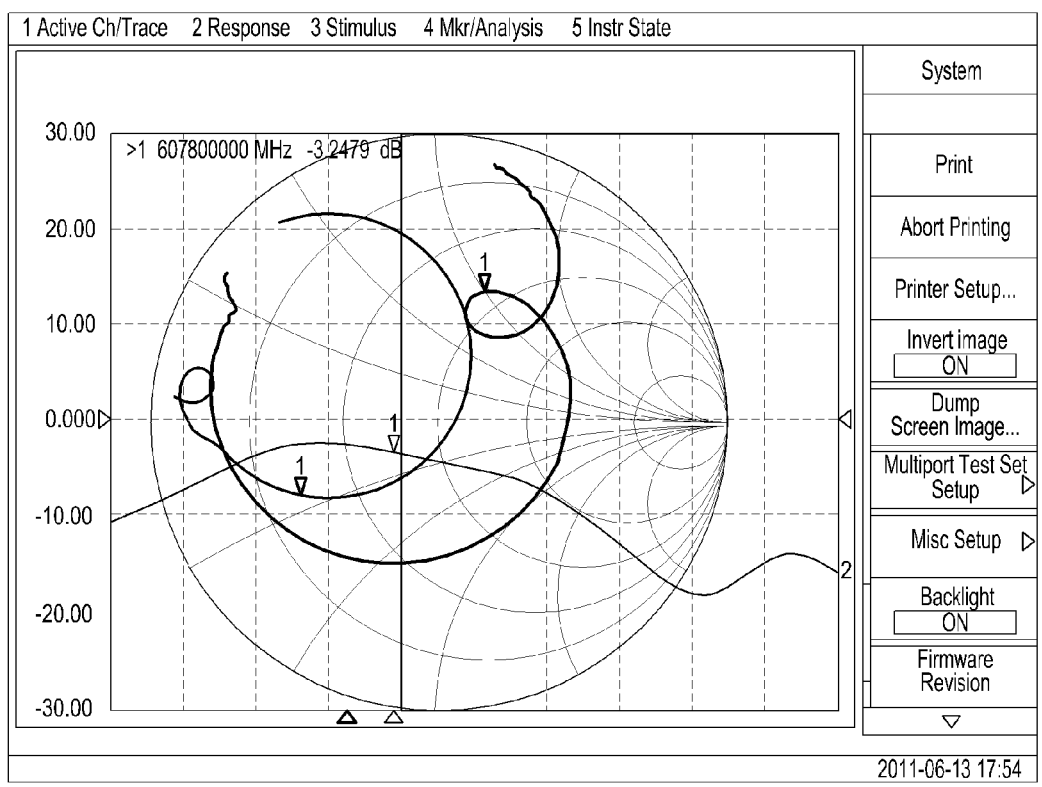
FIG. 5 is a chart showing transmission efficiency of FIGS. 4A and 4B, according to embodiments of the present invention.

Specifically, as described above, the impedance increase in the charging completion mode or the CV mode can be reduced based on the impedance adjuster. Accordingly, as shown in FIG. 5, the transmission efficiency S21 can be reduced from −1 dB to −3.2 dB. Specifically, it can be identified that the problem related to the transmission efficiency decrease is relieved through a comparison with the transmission efficiency of −8 dB in FIG. 2B.

Figure 6A:
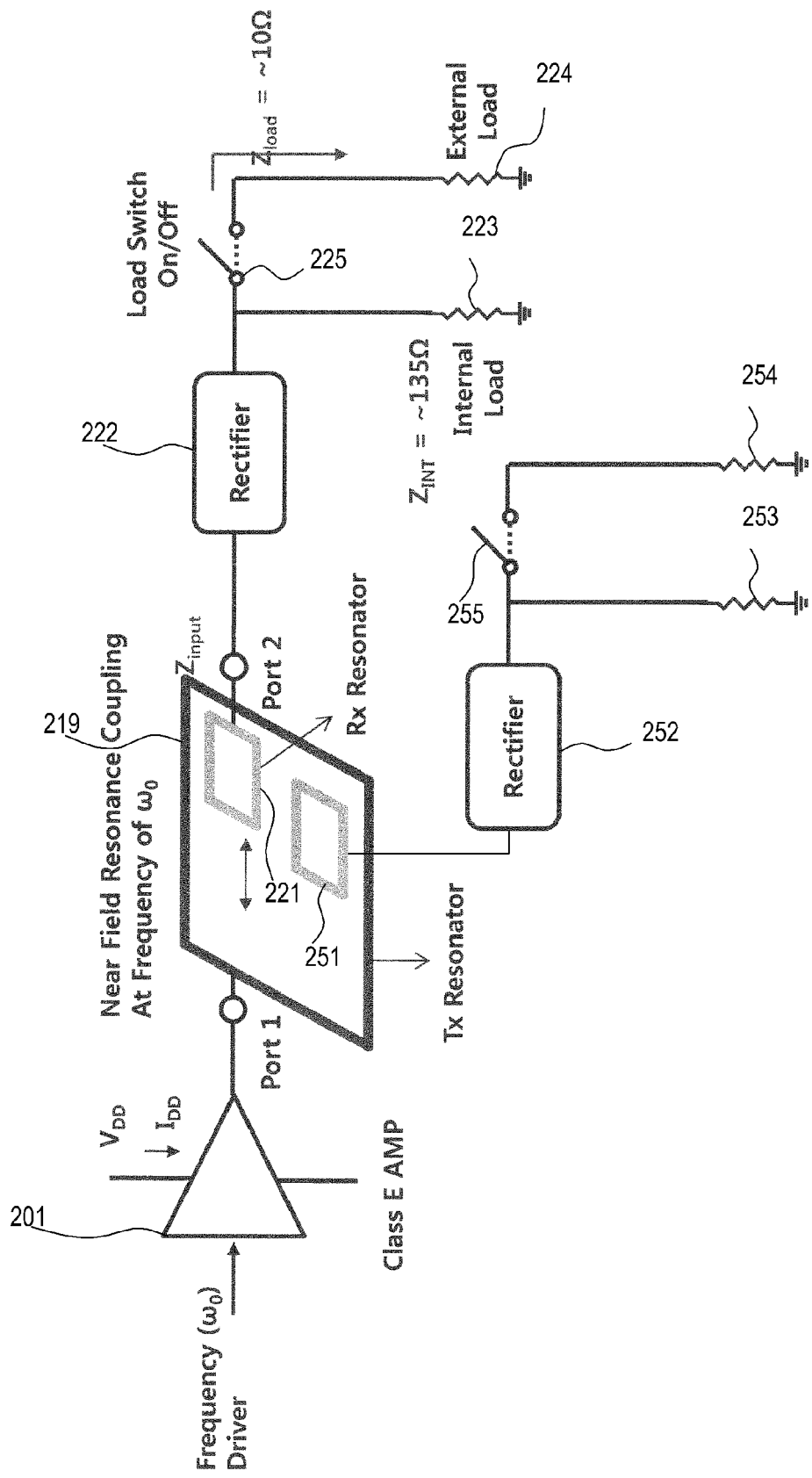
FIG. 6A is a circuit diagram illustrating a wireless power transmitter and receivers, according to an embodiment of the present invention.

FIG. 6A is a circuit diagram illustrating a wireless power transmitter and a wireless power receiver, according to an embodiment of the present invention. The wireless power transmitter, according to FIG. 6A, includes the amplifier 201 and the power transmission unit 211. Further, the first wireless power receiver includes the power reception unit 221, the rectifier 222, the internal resistor 223, the external resistor 224, and the switch unit 225. A second wireless power receiver includes a second power reception unit 251, a second rectifier 252, a second internal resistor 253, a second external resistor 254, and a second switch unit 255.

The amplifier 201 receives a supply of power, having a voltage of $V_{DD}$ and a current of $I_{DD}$, from a power supplier, and can output the power after transmitting it in an AC at a frequency of $\omega_0$, such as 6.78 MHz. The amplifier 201 may be embodied as a Class E Amp. The power transmission unit 211 wirelessly transmits power to the power reception unit 221. The rectifier 222 rectifies the received power. The switch unit 225 maintains an on state in a charging mode and an off state in a charging completion mode. Impedance viewed from Port 2 is 10Ω when the switch unit 225 is in the on state, and the impedance viewed from Port 2 is 135Ω when the switch unit 225 is in the off state.

The second power reception unit 251 also wirelessly receives power from the power transmission unit 211. The second rectifier 252 rectifies the received power. The second switch unit maintains the on state in the charging mode and the off state in the charging completion mode.

It is assumed herein that the first wireless power receiver is in the charging mode and the second wireless power receiver is shifted to the charging completion mode.

When the second wireless power receiver's own impedance is changed since the second wireless power receiver has been shifted to the charging completion mode, the impedance of the first wireless power receiver may be affected. Further, the change of the impedance of the second wireless power receiver also affects the transmission efficiency S21 of the first wireless power receiver.

Figure 6B:
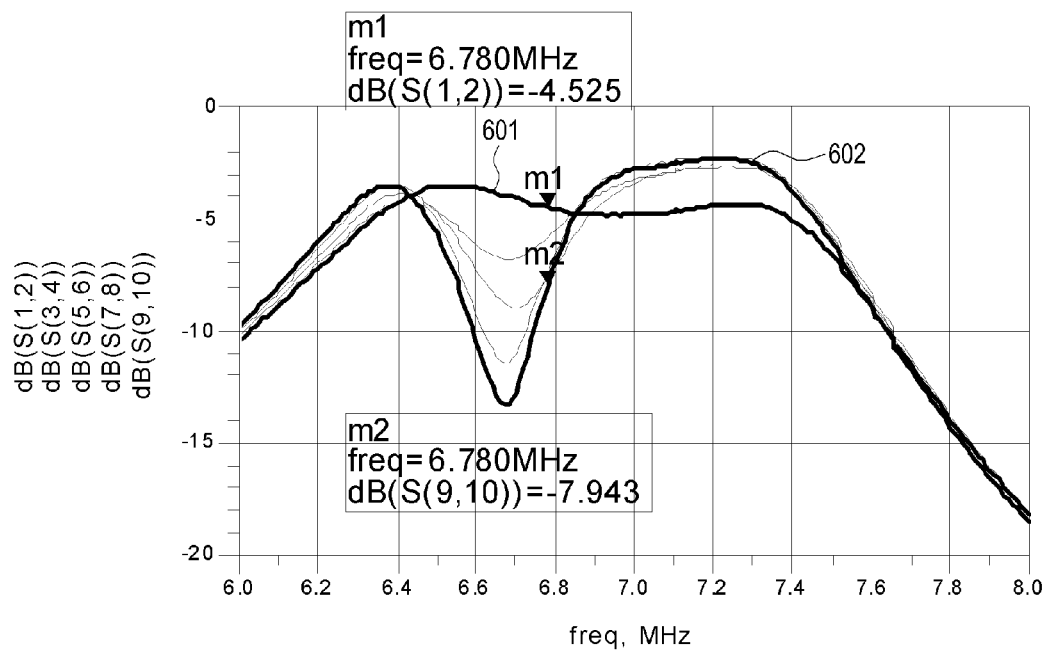
FIG. 6B is a chart showing transmission efficiency of FIG. 6A, according to a embodiment of the present invention.

FIG. 6B is a graph of the transmission efficiency S21 of the first wireless power receiver when the second wireless power receiver's own impedance is changed. In FIG. 6B, it can be identified that the transmission efficiency S21 is reduced from −4.5 Db (601) to −8 dB (602) at 6.78 MHz. Specifically, the change of the second wireless power receiver's own impedance affects the transmission efficiency S21 of the first wireless power receiver. The aforementioned phenomenon is described with reference to FIG. 6C below.

Figure 6C:
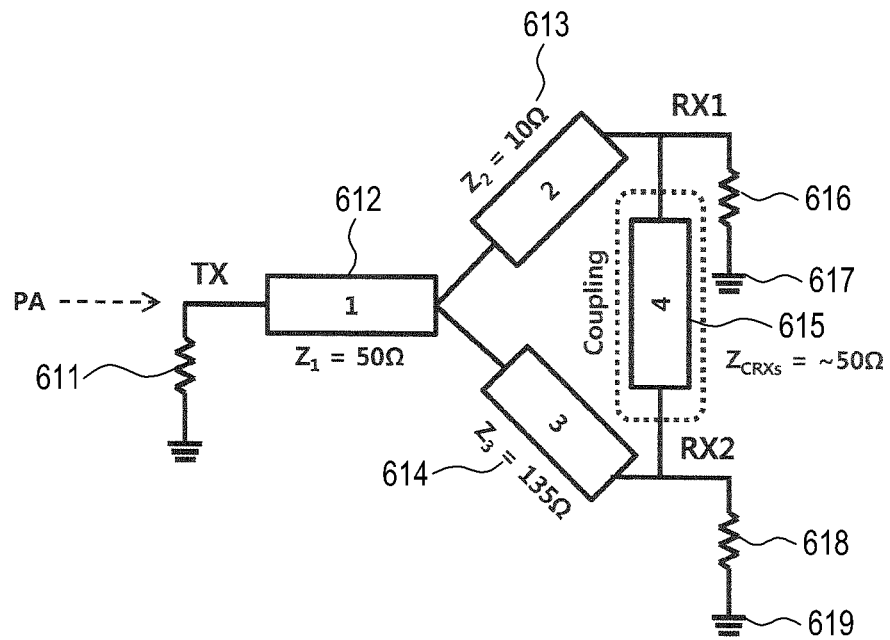
FIGS. 6C and 6D are circuit diagrams illustrating wireless power transmitter and receivers, according to embodiments of the present invention.

FIG. 6C is a circuit diagram illustrating the wireless power transmitter, the first receiver, and the second receiver, according to an embodiment of the present invention. The circuit includes a first resistor 611, one end of which is grounded, a first load 612, one end of which is connected to the other end of the first resistor 611, a second load 613, one end of which is connected to the other end of the first load 612, and a third load 614, one end of which is connected to the other end of the first load 612. Further, a fourth load 615 can be formed between the other end of the second load 613 and the other end of the third load 614. The fourth load 615 can be formed by a coupling between the first wireless power receiver and the second wireless power receiver.

One end of a second resistor 616 is connected to the second load 613, and the other end of the second resistor 616 is connected to a first ground 617. Further, one end of a third resistor 618 is connected to the third load 614 and the other end of the third resistor 618 is connected to a second ground 619. In the above embodiment of the present invention, it is assumed that the first wireless power receiver is operated in the charging mode and the second wireless power receiver is operated in the charging completion mode. The first load 612 may be 50Ω, the second load 613 may be 10Ω, the third load 614 may be 135Ω, and the fourth load 615 may be 50Ω.

Figure 6D:
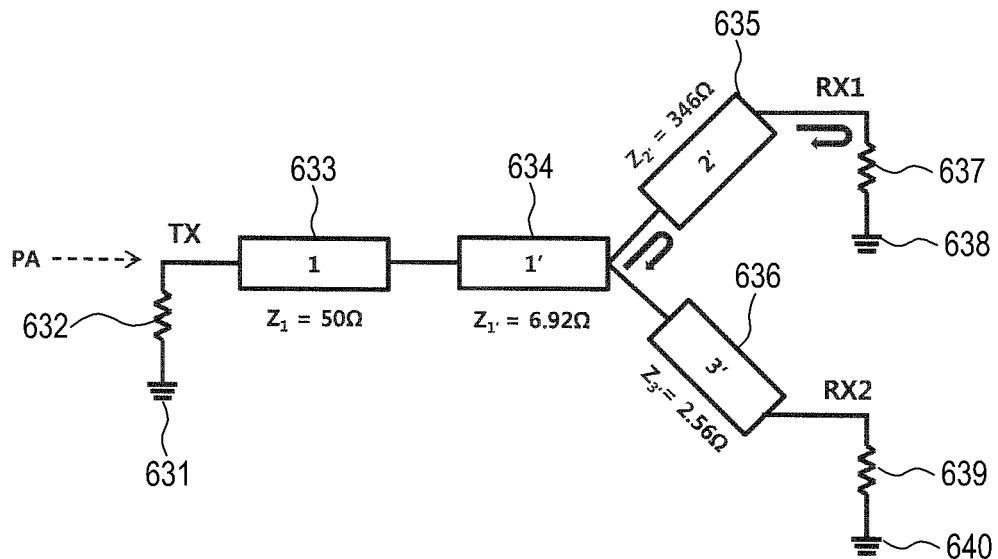

FIG. 6D is a circuit diagram illustrating, the wireless power transmitter, the first receiver and the second receiver, according to an embodiment of the present invention. In FIG. 6D, one end of a first resistor 632 is connected to a first ground 631, and the other end of the first resistor 632 is connected to one end of a first load 633. The other end of the first load 633 is connected to one end of a second load 634. The other end of the second load 634 is connected to one end of a third load 635 and one end of a fourth load 636. The other end of the third load 635 is connected to one end of a second resistor 637, and the other end of the second resistor 637 is connected to a second ground 638. The other end of the fourth load 636 is connected to one end of a third resistor 639, and the other end of the third resistor 639 is connected to a third ground 640. The load first 633 may be 50Ω, the second load 634 may be 6.92Ω, the third load 635 may be 346Ω, and the fourth load 636 may be 2.56Ω.

The loads of FIG. 6C and the loads of FIG. 6D are related as shown in Equations (1) to (3) below.

$$Z'_1 = \frac{Z_2 Z_3}{Z_1 + Z_2 + Z_3} \quad (1)$$

$$Z'_2 = \frac{Z_1 Z_3}{Z_1 + Z_2 + Z_3} \quad (2)$$

$$Z'_3 = \frac{Z_1 Z_2}{Z_1 + Z_2 + Z_3} \quad (3)$$

In Equations (1) to (3), $Z_1$, $Z_2$, and $Z_3$ are the impedance of the second load 613, the third load 614, and the fourth load 615 of FIG. 6C, respectively. Further, $Z'_1$, $Z'_2$, and $Z'_3$ are the impedance of the second load 634, the third load 635, and the fourth load 636 of FIG. 6D, respectively.

Meanwhile, as shown in FIG. 6D, the impedance of the third load 635 is increased more in comparison with the impedance of the second load 613 of FIG. 6C, and accordingly the transmission efficiency S21 of the first wireless power receiver is reduced.

Figure 6E:
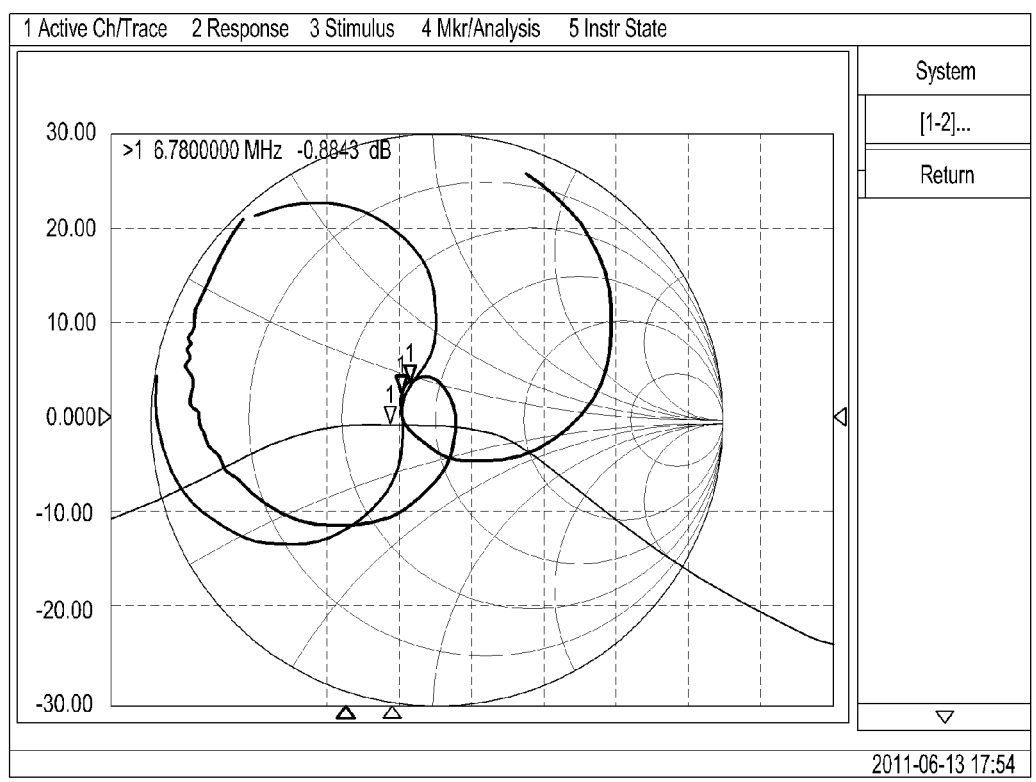
FIGS. 6E and 6F are charts showing transmission efficiency of FIGS. 6C and 6D, according to embodiments of the present invention.
Figure 6F:
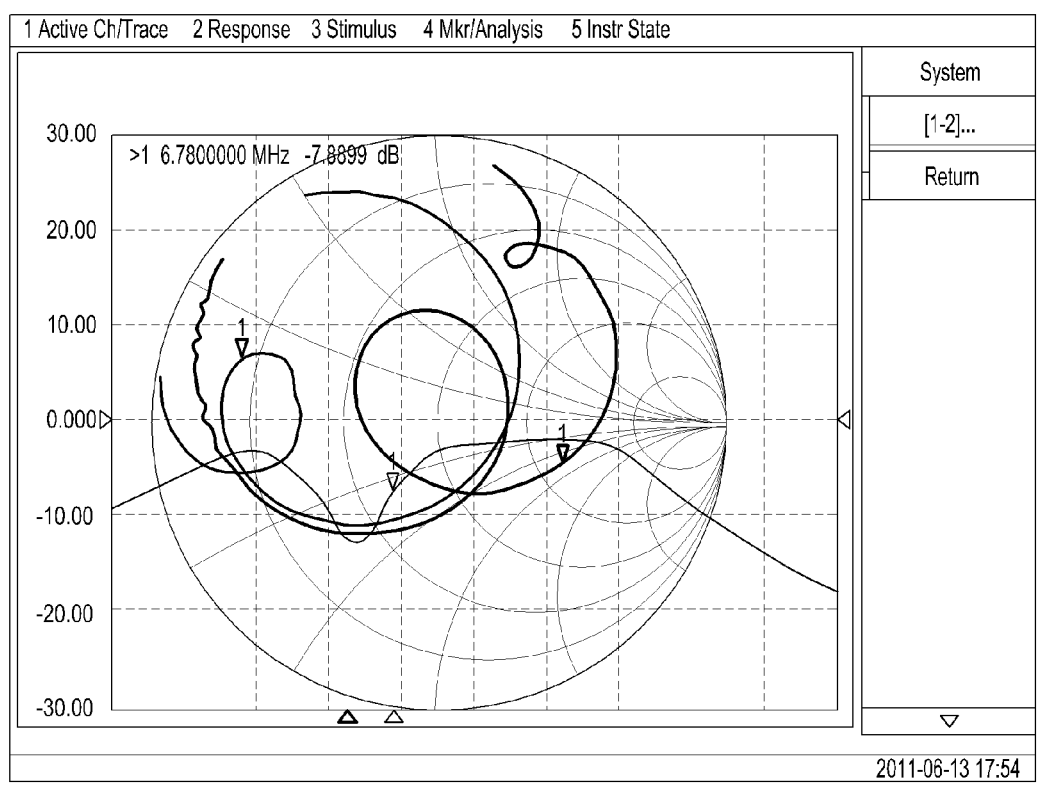

FIGS. 6E and 6F are diagrams illustrating transmission efficiencies of the first wireless power receiver corresponding to a case where the second wireless power receiver is in the charging mode and the second wireless power receiver is in the charging completion mode, according to an embodiment of the present invention. As shown in FIGS. 6E and 6F, when the second wireless power receiver's own impedance is changed, the transmission efficiency of the first wireless power receiver is changed.

Accordingly, it is desirable to develop a technology in which the transmission efficiency of the first wireless power receiver is not affected even when the second wireless power receiver's impedance is changed.

Figure 7A:
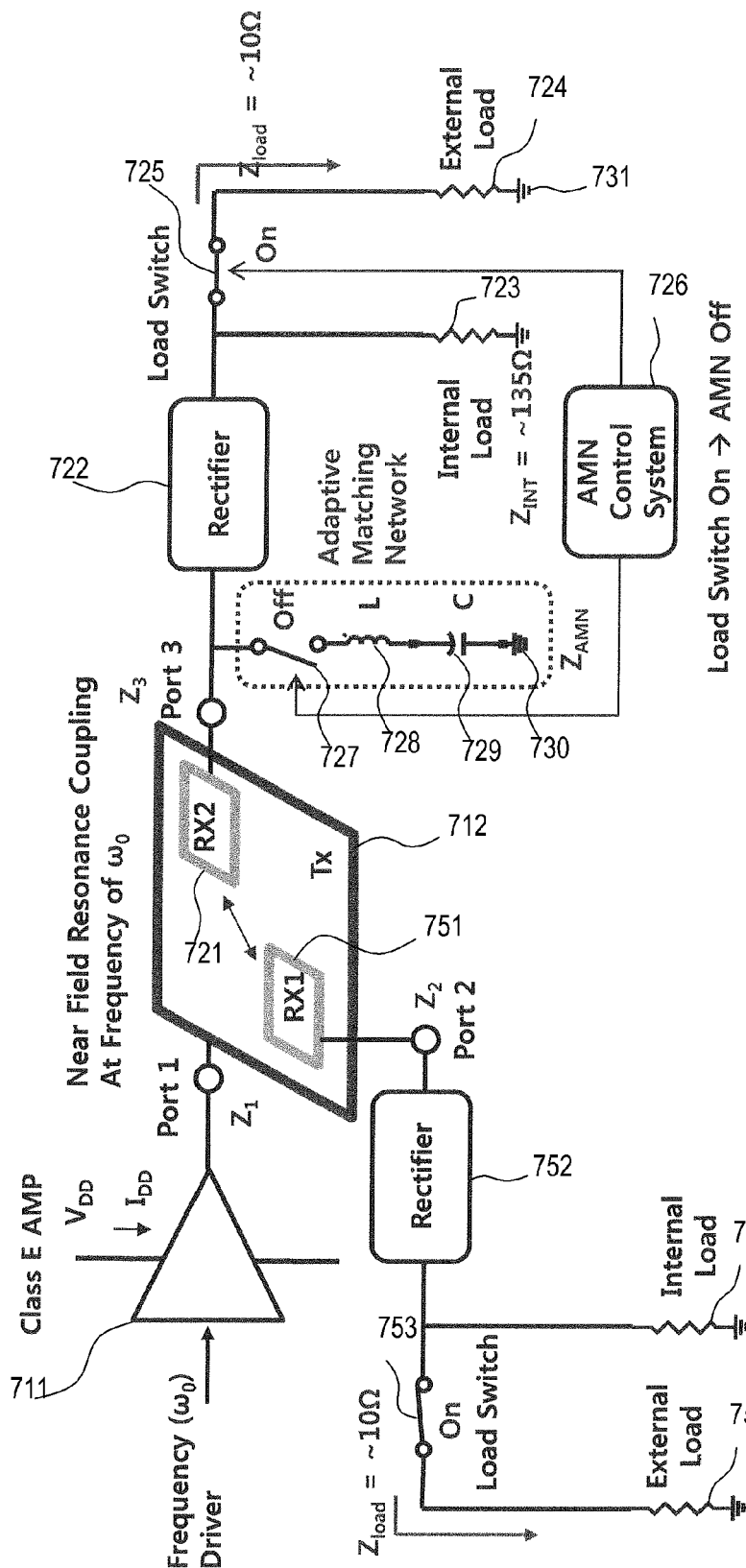
FIGS. 7A and 7B are circuit diagrams illustrating wireless power transmitter and receivers, according to embodiments of the present invention.
Figure 7B:
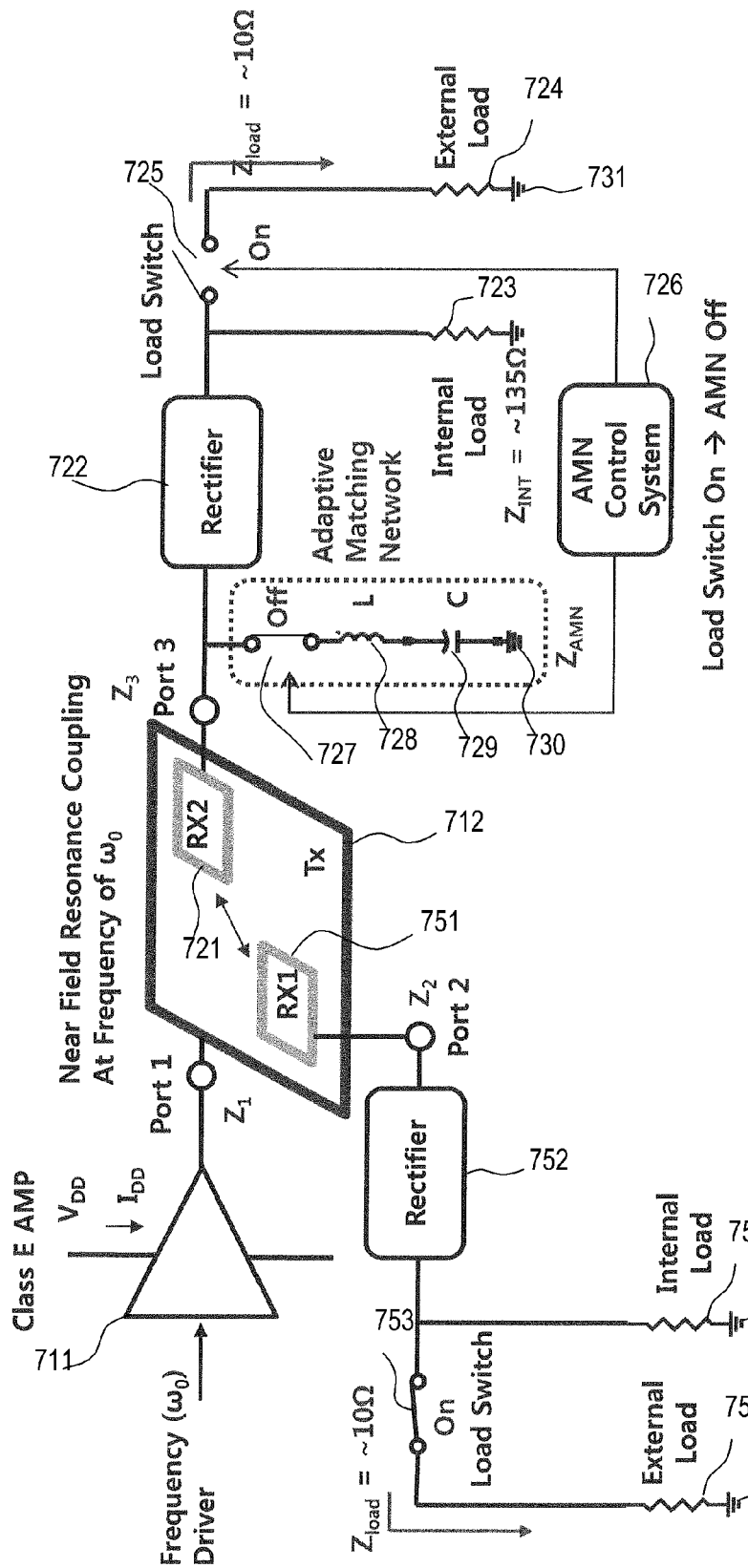

FIGS. 7A and 7B are circuit diagrams illustrating a wireless power transmitter, a first wireless power receiver, and a second wireless power receiver, according to embodiments of the present invention.

As shown in FIGS. 7A and 7B, a wireless power transmitter includes an amplifier 711 and a power transmission unit 912. A first wireless power receiver includes a first power reception unit 721, a first rectifier 722, a first internal resistor 723, a first external resistor 724, a first switch unit 725, a controller 726, a second switch unit 727, an inductor unit 728, a capacitor unit 729, and a first ground unit 730. A second wireless power receiver includes a second power reception unit 751, a second rectifier 752, a second internal resistor 724, a second external resistor 756, and a third switch unit 753.

In an embodiment of the present invention shown in FIG. 7A, it is assumed that both the first and second wireless power receivers are in the charging mode.

The amplifier 711 receives a supply of power, having a voltage of $V_{DD}$ and a current of $I_{DD}$, from a power supplier. The amplifier can output the power after transmitting it in an AC having a frequency of $\omega_0$, such as 6.78 MHz. The amplifier 711 may be embodied as a Class E Amp. The power transmission unit 712 wirelessly transmits power to the first power reception unit 721 and the second power reception unit 751. The first and second rectifiers 722 and 752 rectify the received power.

The first and third switch units 725 and 753 maintain the on state in the charging mode and the off state in the charging completion mode. Impedance viewed from Port 2 is 10Ω when the first and third switch units 725 and 753 are in the on state, and the impedance viewed from Port 2 is 135Ω when the first and third switch units 725 and 753 are in the off state.

In FIG. 7A, the second switch unit 727 maintains the off state. For example, the controller 726 maintains the second switch unit 727 in the off state by detecting the on state of the first switch unit 725.

In FIG. 7B, the controller 726 can detect the charging completion mode by identifying that the first switch unit 725 is in the off state. The controller 726 can switch the second switch unit 727 to the on state. When the second switch unit 727 is in the on state, the inductor unit 728, the capacitor unit 729, and the ground 730 can be connected to the rectifier 722. Accordingly, impedance viewed from Port 2 can be adjusted to 10Ω. Also, as the first wireless power receiver's own impedance is readjusted, the transmission efficiency of the second wireless power receiver is not affected.

Figure 7C:
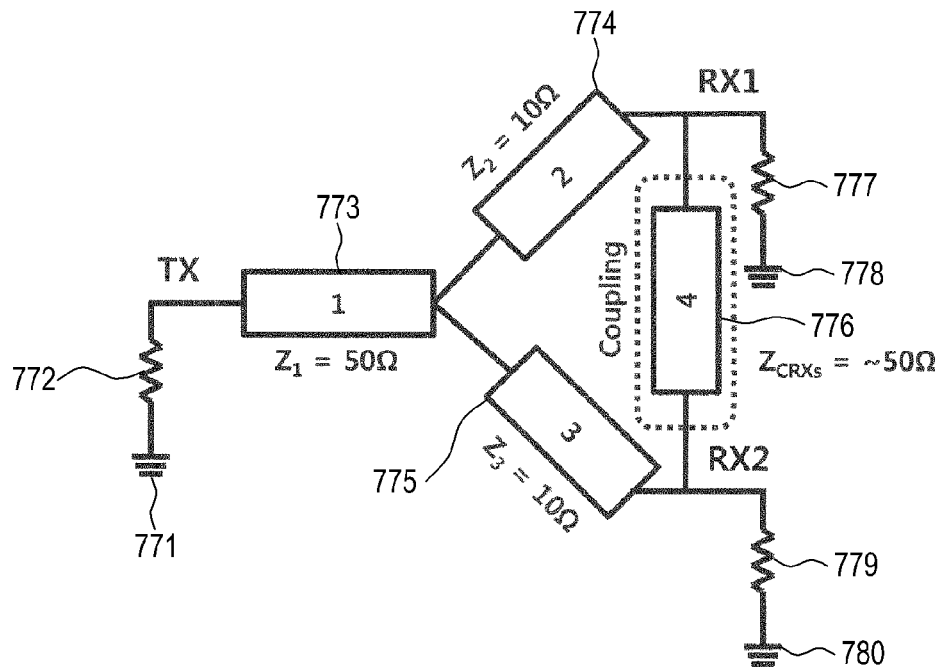
FIGS. 7C and 7D are circuit diagrams illustrating wireless power transmitter and receivers, according to embodiments of the present invention.
Figure 7D:
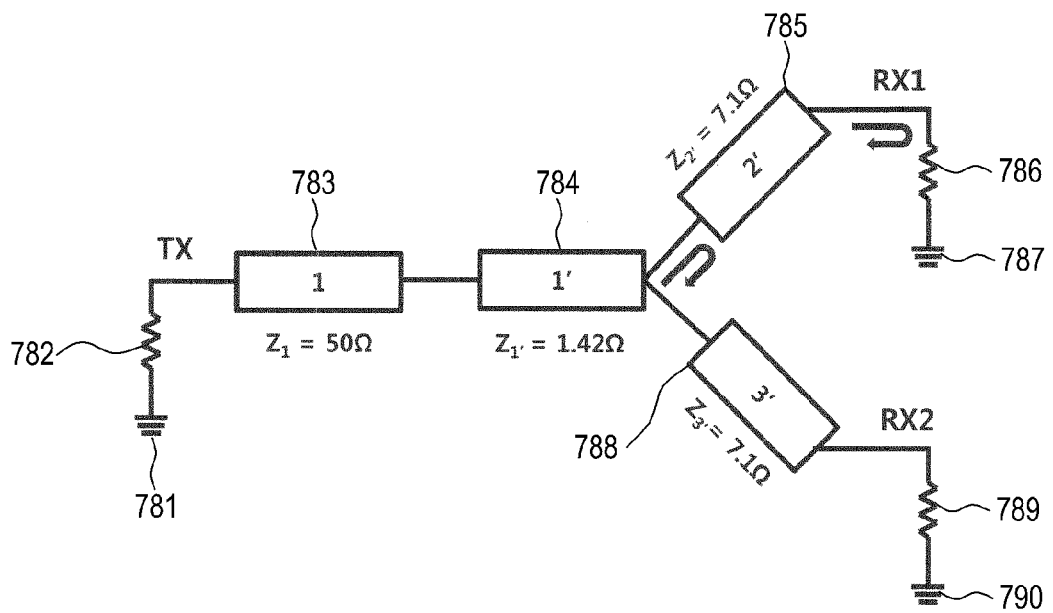

FIGS. 7C and 7D illustrate equivalent circuits of FIG. 7B. The equivalent circuit of FIG. 7C includes a first resistor 772, one end of which is connected to a first ground 771, a first load 773, one end of which is connected to the other end of the first resistor 772, a second load 774, one end of which is connected to the other end of the first load 773, and a third load 775, one end of which is connected to the other end of the first load 773. Further, a fourth load 776 can be formed between the other end of the second load 774 and the other end of the third load 775. The fourth load 776 can be formed by a coupling between the first wireless power receiver and the second wireless power receiver.

One end of a second resistor 777 is connected to the second load 774, and the other end of the second resistor 777 is connected to a second ground 778. Further, one end of a third resistor 779 is connected to the third load 775, and the other end of the third resistor 779 is connected to a third ground 760. In the above embodiment of the present invention, it is assumed that the first wireless power receiver is operated in the charging completion mode, the second wireless power receiver is operated in the charging mode, and the impedance adjuster is connected. The first load 773 may be 50Ω, the second load 774 may be 10Ω, the third load 775 may be 10Ω, and the fourth load 776 may be 50Ω. Specifically, the impedance of the third load 775 can be changed to 10Ω by the impedance adjuster.

FIG. 7D illustrates an equivalent circuit of FIG. 7C, and can be formed through Equations (1) to (3) described above. In FIG. 7D, one end of a first resistor 782 is connected to a first ground 781, and the other end of the first resistor 782 is connected to one end of a first load 783. One end of a second load 784 is connected to the other end of the first load 783. One end of a third load 785 and one end of a fourth load 788 are connected to the other end of the second load 784. One end of a second resistor 786 is connected to the other end of the third load 785, and the other end of the second resistor 786 is connected to a second ground 787. One end of a third resistor 789 is connected to the other end of a fourth load 788, and the other end of the third resistor 789 is connected to a third ground 770. Here, the first load 783 may be 50Ω, the second load 784 may be 1.42Ω, the third load 785 may be 7.1Ω, and the fourth load 788 may be 7.1Ω. The first load 785 and the fourth load 788 have the same impedance, and accordingly a problem in which the transmission efficiency of the first wireless power receiver is reduced can be relieved.

Figure 8:
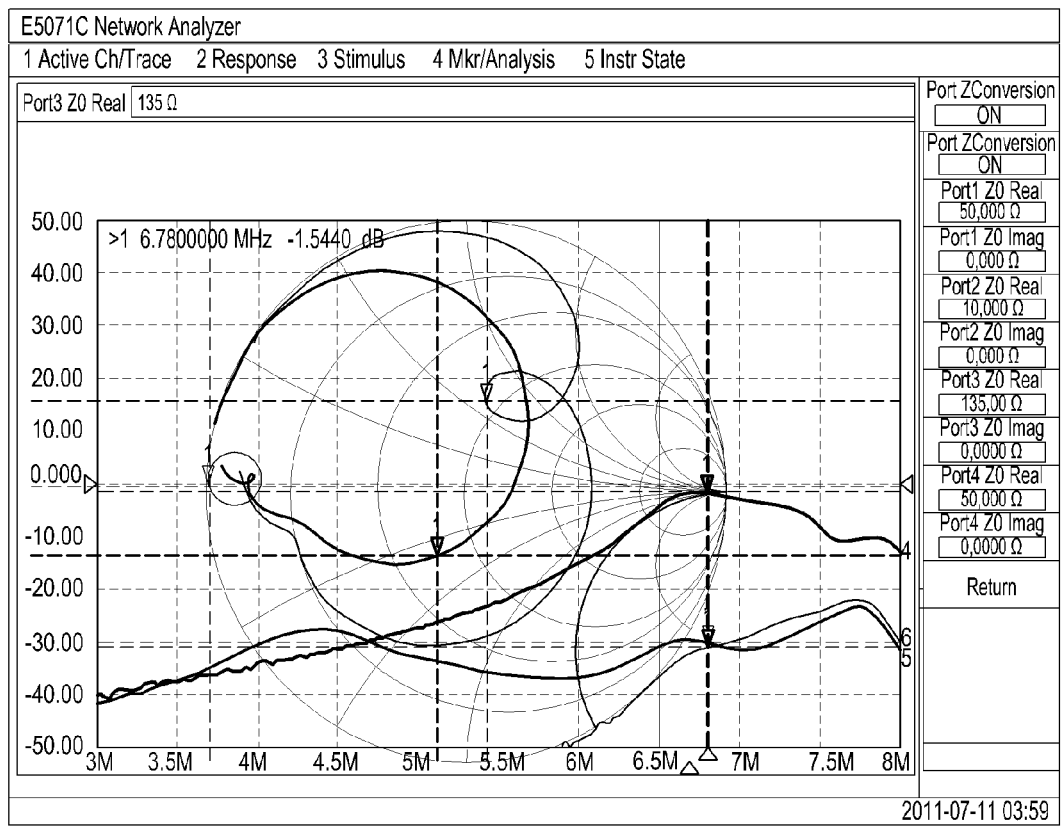
FIG. 8 is a chart showing transmission efficiency of the first wireless power receiver, according to embodiments of the present invention.

FIG. 8 is a diagram illustrating the transmission efficiency of the first wireless power receiver according to embodiments of the present invention. As shown in FIG. 8, it can be identified that the transmission efficiency of the first wireless power receiver is only slightly affected although internal impedance of the first wireless power receiver is changed, the transmission efficiency being changed from −1 dB to 1.5 dB.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A wireless power receiver configured to wirelessly receive charging power from a wireless power transmitter, the wireless power receiver comprising:

a power reception unit configured to wirelessly receive the charging power from the wireless power transmitter;

a rectifier configured to rectify the charging power from the power reception unit;

a load unit configured to store the rectified charging power from the rectifier;

an impedance adjuster connected to the power reception unit, wherein the impedance adjuster and the rectifier are connected to each other in parallel;

a switch configured to selectively connect the impedance adjuster to the power reception unit; and a controller configured to:
   control the switch not to connect the impedance adjuster to the power reception unit,
   detect a change of a charging mode for the load unit while the impedance adjuster is not connected to the power reception unit, and
   control the switch to connect the impedance adjuster to the power reception unit for adjusting an impedance in the power reception unit according to the change of the charging mode.

2. The wireless power receiver as claimed in claim 1, wherein the controller detects that the charging mode is changed from a Constant Current (CC) mode to a Constant Voltage (CV) mode.

3. The wireless power receiver as claimed in claim 2, wherein the controller is further configured to control the switch to be in an off state in the CC mode and to be in an on state in the CV mode.

4. The wireless power receiver as claimed in claim 1, wherein the impedance adjuster comprises one or more of a capacitor, a coil, and a resistor.

5. The wireless power receiver as claimed in claim 4, wherein the capacitor, the coil, and the resistor are a variable capacitor, a variable coil, and a variable resistor, respectively.

6. The wireless power receiver as claimed in claim 2, wherein the impedance adjuster is further configured to adjust the impedance such that the impedance of the wireless power receiver is substantially equal in the CC mode and the CV mode.

* * * * *